United States Patent [19]

McNeil et al.

[11] Patent Number: 5,164,790

[45] Date of Patent: Nov. 17, 1992

[54] SIMPLE CD MEASUREMENT OF PERIODIC STRUCTURES ON PHOTOMASKS

[76] Inventors: John R. McNeil, 13423 Desert Hills, NE., Albuquerque, N. Mex. 87111; Kirt C. Hickman, 12316 Collier Ct., NE., Albuquerque, N. Mex. 87112; Susan M. Gaspar, 1920 Vassar Dr., NE., #32, Albuquerque, N. Mex. 87106; S. Sohail H. Naqvi, 8409 Racheleigh, NE., Albuquerque, N. Mex. 87109

[21] Appl. No.: 661,754

[22] Filed: Feb. 27, 1991

[51] Int. Cl.⁵ .............................. G01B 9/02
[52] U.S. Cl. ............................ 356/355; 356/384
[58] Field of Search ............. 356/355, 354, 381, 384, 356/387; 250/560

[56] References Cited

U.S. PATENT DOCUMENTS 4,330,213  5/1982  Kleinknecht et al. ............. 356/355

OTHER PUBLICATIONS

C-M Yuan, J. Shaw, W. Hopwell, "Modeling of optical alignment images for semiconductor structures," Proc. SPIE, vol. 1088, pp. 392–402, 1989.

D. Nyyssonen, B. Monteverde, "Linewidth Edge Detection Algorithm for Coherent Image Profiles," Proc. SPIE, vol. 1087, pp. 146–152, Feb. 1989.

D. Nyyssonen, "Practical method for edge detection and focusing for linewidth measurements on wafers," Opt. Eng., pp. 81–85, Jan. 1987.

H. P. Kleinknecht, H. Meier, "Linewidth Measurement on IC Masks and Wafers by Grating Test Patterns," Appl Optics, vol. 19, No. 4, pp. 525–533, Feb. 15, 1980.

M. G. Moharam, T. K. Gaylord, "Diffraction analysis of dielectric surface-relief gratings," Journal Opt Soc Am, vol. 72, pp. 1385–1392, Oct. 1982.

Primary Examiner—Samuel A. Turner
Assistant Examiner—Richard E. Kurtz, II

[57] ABSTRACT

For critical dimension (CD) metrology of photomasks, a laser scatterometer linewidth measurement tool provides noncontact rapid, and nondestructive measurement of linewidth. Calculation of the linewidth is based on a rigorous theoretical model, thus eliminating the need for calibrations. A chrome-on-glass diffraction grating is illuminated with a laser. A photodetector mounted behind the photomask measures the scattered power in each diffracted order. This provides data for the rigorous theoretical model which provides a relationship between the linewidth of the photomask grating and the fraction of total power diffracted into the transmitted zero-order. This scatterometer linewidth measurement technique provides a simple, rapid, nondestructive, and noncontact method of linewidth determination which takes into account the effect of the glass substrate on which the grating is placed. This technique is insensitive to variations in angle of incidence, spot size, position of the spot on the grating, polarization and wavelength.

10 Claims, 6 Drawing Sheets

SIMPLE CD MEASUREMENT OF PERIODIC STRUCTURES ON PHOTOMASKS

BACKGROUND

In the field of microelectronics, particularly metrology, accurate measurement of linewidths on photomasks is a crucial first step in the production of devices having submicron feature size. In recent years, a useful, new technique for characterizing periodic topographic structures has been scatterometry. Scatterometry is a technique which involves directing a light beam, typically a laser, on an area to be characterized and measuring the angular distribution of the light which is elastically scattered from that area. It is nondestructive, noncontaminating and noninvasive. No sample preparation is necessary. Only a light beam impinges on the surface of interest, and nothing is changed in the sample during the measurement.

Prior art optical measurement systems form a different broad class of instrumentation used for linewidth measurements. Each of these prior art optical linewidth measurement systems provides an image profile of the feature to be measured and uses a particular edge detection algorithm to determine the linewidth. One of the most often encountered sources of error in submicron dimensional metrology is determining the location of the edge on the image profile of the feature. The modeling of formation of optical image profiles from thick submicron features is an area of active research according to C-M. Yuan, J. Shaw and W. Hopwell, "Modeling of optical alignment images for semiconductor structures," *Proc. SPIE*, Vol. 1088, pp. 392-402, 1989. The inverse problem, however, of prediction of linewidths from observed image profiles in a microscope, remains an open problem for thick submicron features as noted by D. Nyyssonen and B. Monteverde, "Linewidth Edge Detection Algorithm for Coherent Image Profiles," *Proc. SPIE*, vol. 1087, pp. 146-152, February 1989. This implies that there is no rigorous foundation for use of a particular edge detection methodology in an optical microscope as indicated by D. Nyyssonen, "Practical method for edge detection and focusing for linewidth measurements on wafers," *Optical Engineering*, pp. 81-85, January 1987. It is necessary to model the diffraction effects in order to understand the optical image produced by a particular feature. Analysis of diffraction from an arbitary object is complex. However, the problem is simplified if the diffracting feature is periodic (diffraction grating). In this case, the scattered field consists of distinct diffraction orders ($\pm n$), whose angular position ($\theta_n$) is given by the well known grating formula, $$\sin\theta_n = \sin\theta_i + n\frac{\lambda}{d}. \quad n = 0, \pm 1, \pm 2, \ldots \quad (1)$$

Here $\theta_i$ is the angle of incidence, $\lambda$ is the wavelength of the incident beam, and d is the period, or pitch, of the grating. The distribution of diffracted power among the various orders is related to the geometry of the diffraction grating. The inverse problem then consists of determining the parameters of interest (linewidth, height, sidewall angle) from a measurement of the diffracted power in the different orders. In this connection the use of coherent illumination and analysis of the diffraction pattern in the Fourier plane has been considered previously by H. P. Kleinknecht and H. Meier, "Linewidth Measurement on IC Masks and Wafers by Grating Test Patterns," *Applied Optics*, vol. 19, No. 4, pp. 525-533, Feb. 15, 1980. The use of an approximate analysis restricted the application of this technique to the case in which the angle of incidence was equal to Brewster's angle, and the period was greater than the wavelength. In addition, the previous treatment was best suited for a situation in which the linewidth to pitch ratio was approximately 0.25.

Reference is now made to the drawings in which like reference numerals refer to like portions and in which.

DESCRIPTION OF PRESENT INVENTION

Figure 1:
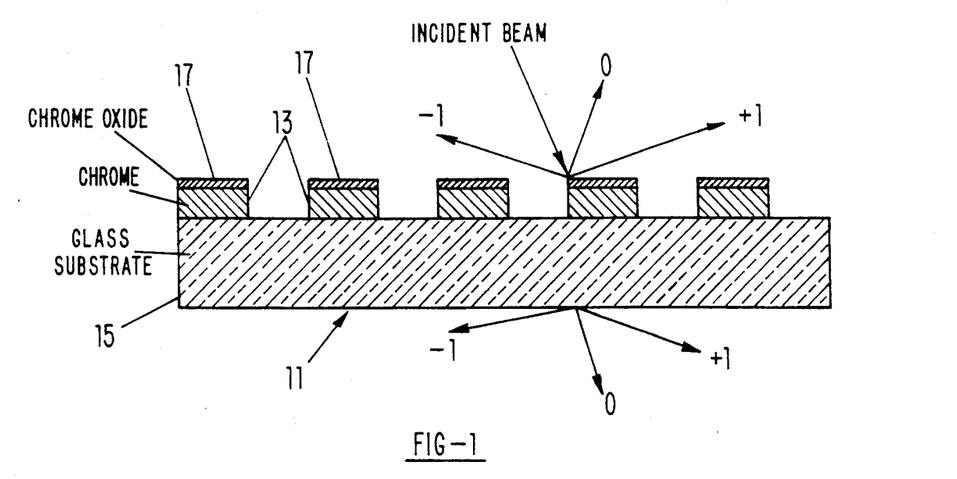
FIGS. 1 and 2 are diagrammatic views of a structure for explaining scatterometer measurement in accordance with the invention.

Referring to FIG. 1 there is shown a portion of a photomask grating structure 11 comprised of parallel strips of chrome 13 deposited on a glass substrate 15 and covered with an antireflecting layer of $CrO_2$ 17. The glass substrate 15 is not uniformly thick, and this produces a local variation in the optical thickness of the substrate across the grating structure 11. When a laser beam is incident on the grating, the scattered field consists of multiple diffracted orders, of which the specular reflected and transmitted zero-orders carry the DC information indicating the percentage of area covered by the line. While the scattered power in the reflected zero-order is reduced due to the absorbing nature of chrome at the incident wavelength, the fraction of power diffracted into the transmitted zero-order is mostly unaffected by the chrome grating structure. In addition, the scattered power in the transmitted zero-order decreases monotonically with increasing linewidth of the photomask grating. An inverse relationship can then relate the fraction of power scattered into the transmitted zero-order to the linewidth of the photomask grating.

To determine the inverse relationship, the chrome-on-glass grating 11 is initially modeled on a purely theoretical basis to be an infinitely thin, perfectly conducting, strip grating placed on top of a uniform glass substrate. The perfectly conducting model, however, ignores both the thickness and finite conductivity of the photomask grating structure. We therefore compare the results obtained using the perfectly conducting model to those obtained using the Moharram and Gaylord coupled wave analysis as found in M. G. Moharram and T. K. Gaylord, "Diffraction analysis of dielectric surface-relief gratings," *Journal of the Optical Society of America*, vol. 72 pp. 1385–1392, October 1982. The effect of the local variation of the thickness of the glass substrate is modeled by averaging the intensity of zero-order transmitted power, obtained for different values of substrate thickness. Equivalently, the glass substrate can be modeled to be infinitely thick and the results corrected to account for back reflections from the glass-air boundary. The incident beam is modeled to be an obliquely incident, TE or TM polarized plane wave. The latter assumption of an incident plane wave is a mathematical convenience. It is valid because the power diffracted into the various orders is independent of the curvature of the phase front of the incident beam.

Figure 2:
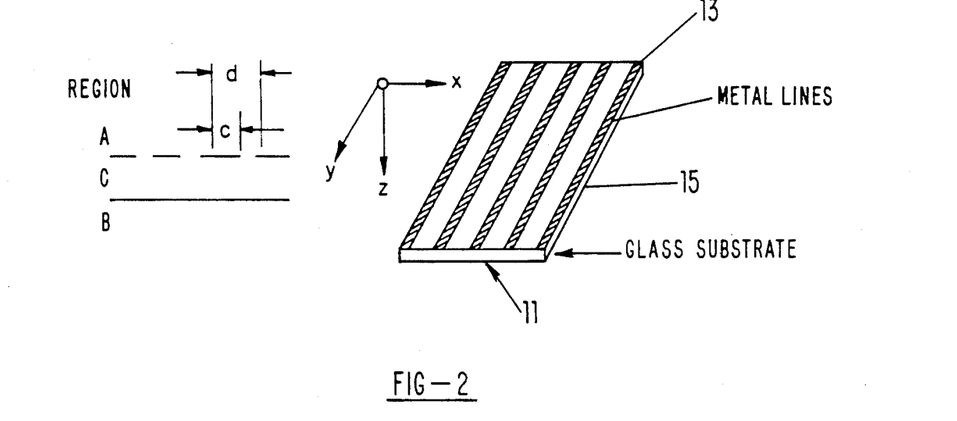

The theoretical structure to be analyzed is illustrated in FIG. 2. Regions A and B represent the regions above and below the photomask grating, respectively, while region C represents the region inside the glass substrate and $c$ represents the width of each chrome/chrome oxide strip 13 and d is the sum of the width of a strip and one space between two strips, i.e., the grating period. In the perfectly conducting case, the field above the grating, in region A, can be described by the Rayleigh expansion as the sum of an incident plane wave and multiple backward diffracted orders, with complex amplitudes $R_n$, as $$E_1(x,y,z) = \mathrm{Exp}(-i\vec{k}_1 \cdot \vec{r}) + \sum_{n=-\infty}^{\infty} R_n \mathrm{Exp}(-i\vec{k}_{1n} \cdot \vec{r}). \tag{2}$$

For region B only the forward diffracted orders exist, with complex amplitudes $T_n$, represented by $$E_3(x,y,z) = \sum_{n=-\infty}^{\infty} T_n \mathrm{Exp}(-i\vec{k}_{3n} \cdot \vec{r}) \mathrm{Exp}(i\vec{k}_{3n} \cdot \hat{z}w), \tag{3}$$

where w, the substrate thickness, is the width of region 2. $\vec{r} = x\hat{x} + y\hat{y} + z\hat{z}$, and $\hat{x}$, $\hat{y}$, $\hat{z}$ are unit vectors in the x, y, and z directions, respectively. Thus the scattered field can be treated as a sum of plane waves with wave vectors $\vec{k}_{1n}$ and $\vec{k}_{3n}$. The corresponding field representation inside the glass substrate consists of a sum of forward and backward diffracted orders with complex amplitudes $X_n$ and $Y_n$, respectively, $$E_2(x,y,z) = \sum_{n=-\infty}^{\infty} (X_n \mathrm{Exp}(-i\vec{k}_{2n} \cdot \hat{z}z) + Y_n \mathrm{Exp}(i\vec{k}_{2n} \cdot \hat{z}z)) \tag{4}$$

$$\mathrm{Exp}(-i(\vec{k}_{2n} \cdot x\hat{x} + \vec{k}_{2n} \cdot y\hat{y})).$$

For any value of x, the strip grating structure is invariant with respect to y. The incident wave is TE or TM polarized with the E-field or H-field vector in the y-direction and is constant with respect to y. The scattered field will therefore not exhibit any variation in the y-direction. Since the scattering surface is periodic, each diffracted mode must satisfy the "Floquet condition," whereby the scattered field is also periodic in the x-direction, with period d. In addition the tangential electric field across any boundary is continuous. Therefore $$\vec{k}_{pn} \cdot \hat{x} = \vec{k}_p \cdot \hat{x} - \frac{n2\pi}{d}, \tag{5}$$

where p = 1, 2 or 3, and, $$k_p^2 = (\vec{k}_p \cdot \hat{X})^2 + (\vec{k}_p \cdot \hat{Z})^2. \tag{6}$$

Substituting Eq. 5 into Eq. 1, it is seen that for any fixed value of z, the respective fields have been expanded in a modified Fourier series. To obtain the solution for the total scattered fields it is necessary to find the Fourier series coefficients (FSC's) $R_n$.

Writing $X_n = D_n Y_n$ inside the glass substrate, the continuity of the tangential electric and magnetic fields at the interface between regions 2 and 3 is used to obtain $$D_n = \mathrm{Exp}(j2\vec{k}_{2n} \cdot \hat{z}w)\left[\frac{\vec{k}_{2n} \cdot \hat{z} + \vec{k}_{3n} \cdot \hat{z}}{\vec{k}_{2n} \cdot \hat{z} - \vec{k}_{3n} \cdot \hat{z}}\right], \tag{7}$$

where w is the thickness of the glass substrate 15. The presence of the strip grating at the interface between regions 1 and 2 modifies the boundary conditions in that the tangential H field is discontinuous due to the presence of a surface current density, $J_y(x)$, on the metallic strips. Applying Maxwell's equations and the boundary conditions, a relationship between the FSC's ($R_n$) of the electric field in the z=0 plane and those of the surface current density ($C_n$) can be obtained. The fields, in the z=0 plane, are expanded as $$E_1(x) = \mathrm{Exp}(-i\vec{k}_1 \cdot x\hat{x}) \sum_{n=-\infty}^{\infty} (R_n + \delta_{n,0})\mathrm{Exp}\left(in\frac{2\pi}{d}x\right) \tag{8}$$

and $$J_y(x) = \mathrm{Exp}(-i\vec{k}_1 \cdot x\hat{x}) \sum_{n=-\infty}^{\infty} C_n \mathrm{Exp}\left(in\frac{2\pi}{d}x\right); \tag{9}$$

where, $$\delta_{n,0} = \begin{cases} 1 & \text{for } n = 0 \\ 0 & \text{elsewhere.} \end{cases}$$

Applying Maxwell's equations and the boundary conditions, a relationship is obtained between the FSC's ($R_n$) of the electric field in the z=0 plane and that of the surface current density ($C_n$):

$$C_n = B_n R_n + v\delta_{n,0} \tag{10}$$

where $$B_n = \frac{i}{\omega\mu}\left[\vec{ik}_{1n} \cdot \hat{z} - \vec{ik}_{2n} \cdot \hat{z}\left[\frac{D_n - 1}{D_n + 1}\right]\right], \tag{11}$$

and $$v = \frac{i}{\omega\mu}\left[-\vec{ik}_{10} \cdot \hat{z} - \vec{ik}_{20} \cdot \hat{z}\left[\frac{D_0 - 1}{D_0 + 1}\right]\right]. \tag{12}$$

Once a relationship between the FSC's of the electric and current fields (Eq. 10) has been obtained, a system of linear equations is derived. The surface current density exists only on the strips while the electric field in the z=0 plane is zero on the infinitely conducting metallic strips. Therefore, if we define $$S(x) = \begin{cases} 0, & \text{in gap} \\ 1, & \text{everywhere else,} \end{cases} \quad (13)$$

we have $$J(x) = S(x)J(x). \quad (14)$$

and $$E(x,O) = E(x,O)[1 - S(x)]. \quad (15)$$

The function $S(x)$ is periodic with period d, and its FSC's, $S_n$ can be easily derived. Thus $$S_n = \begin{cases} \dfrac{1}{i2\pi n}\left\{\text{Exp}\left(-i\dfrac{2\pi}{d}cn\right) - 1.0\right\} & \text{for } n \neq 0, \\ \dfrac{d-c}{d}, & \text{for } n = 0, \end{cases} \quad (16)$$

where c is the width of the metallic strips. In terms of generalized FSC's, Eqs. 14 and 15 can therefore be written as $$C_n = \sum_{p=-\infty}^{\infty} C_p S_{n-p}. \quad (17)$$

and $$R_m + \delta_{m,0} = \sum_{n=-\infty}^{\infty} (R_n + \delta_{n,0})(\delta_{m-n,0} - S_{m-n}). \quad (18)$$

Simplifying and using Eq. 10 to substitute for the value of $R_n$ in Eq. 18, $$R_m = -S_m + \sum_{n=-\infty}^{\infty} \frac{1}{B_n}[C_n - \nu\delta_{n,0}][\delta_{m-n,0} - S_{m-n}]. \quad (19)$$

Using Eq. 17 to substitute for $C_n$ and using Eq. 10 again, $$R_m = -S_m + \quad (20)$$

$$\sum_{n=-\infty}^{\infty} \frac{1}{B_n}\left[\sum_{p=-\infty}^{n}[B_p R_p + \nu\delta_{p,0}]S_{n-p} - \nu\delta_{n,0}\right] \times$$

$$[\delta_{m-n,0} - S_{m-n}].$$

This equation can be better represented using matrix notation as $$[\overline{I} - \overline{Q}]\overline{R} = \overline{P}_d, \quad (21)$$

where $\overline{I}$ is the identity matrix, $$\overline{Q} = \overline{A}_2 \overline{B}^{-1} \overline{A}_1 \overline{B}, \quad (22)$$

and $$\overline{P}_d = \overline{A}_2 \overline{B}^{-1}(\overline{A}_1 - \overline{I})\overline{Y} + \overline{P}. \quad (23)$$

The matrices $\overline{A}_1$, $\overline{A}_2$ and $\overline{B}$ and vectors $\overline{P}$ and $\overline{R}$ are defined as $$\overline{R}[m] = R_m, \quad \overline{Y}[m] = \nu\delta_{m,0}, \quad (24)$$

$$\overline{B}[m,n] = B_n\delta_{m,n}, \quad \overline{B}^{-1}[m,n] = \frac{1}{B_n}\delta_{m,n}. \quad (25)$$

$$\overline{A}_1[m,n] = S_{m-n}, \quad \overline{A}_2[m,n] = \delta_{m-n,0} - S_{m-n}. \quad (26)$$

and $$\overline{P}[m] = -S_m. \quad (27)$$

Equation 21 is the infinite system of linear equations which is truncated and solved to give the Fourier coefficients ($R_n$) of the reflected electric field. If we keep n positive and negative diffracted orders, it was determined that using $n = 15$ was sufficient to obtain accurate theoretical results. The transmitted electric field FSC's ($T_n$) can be computed by matching the boundary conditions at the $z=0$ and $z=w$ boundaries to obtain $$T_n = (D_n \text{Exp}[-i\vec{k}_{2n} \cdot \hat{zw}] + \quad (28)$$

$$\text{Exp}[i\vec{k}_{2n} \cdot \hat{zw}])\left(\frac{1}{1+D_n}\right)(R_n + \delta_{n,0}).$$

Figure 3:
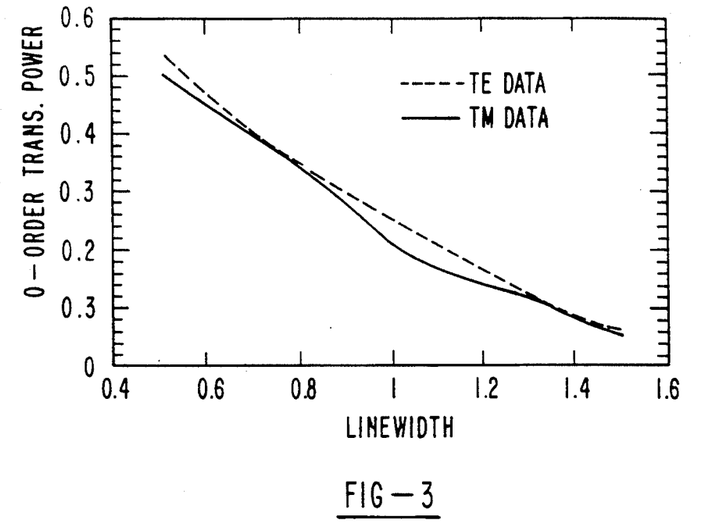
FIG. 3 is a graph of zero-order of transmitted power versus linewidth.

Using this procedure, the fraction of total power diffracted into the transmitted zero-order, $|T_0|^2$, can be theoretically determined for a strip grating placed on top of a uniform glass substrate, such as shown in FIG. 2. This analysis assumes that the glass substrate faces are exactly parallel, which is not the case for a photomask. To account for the local variation in glass thickness, the theoretical analysis is carried out a number of times by varying the substrate thickness. The final value of the transmitted zero-order power can then be obtained by averaging these values. It was determined that a 10 nm increment in thickness averaged over 100 increments provides an accurate theoretical value. Using a smaller increment size or larger number of increments did not increase the accuracy significantly. FIG. 3 is a theoretical plot of the fraction of power diffracted into the transmitted zero-order beam for a 2 micron pitch strip grating placed on glass ($n=1.52$), having a nominal thickness of 1.52 mm. The incident beam is from a HeNe laser with $\lambda=632.8$ nm.

Figure 3A:
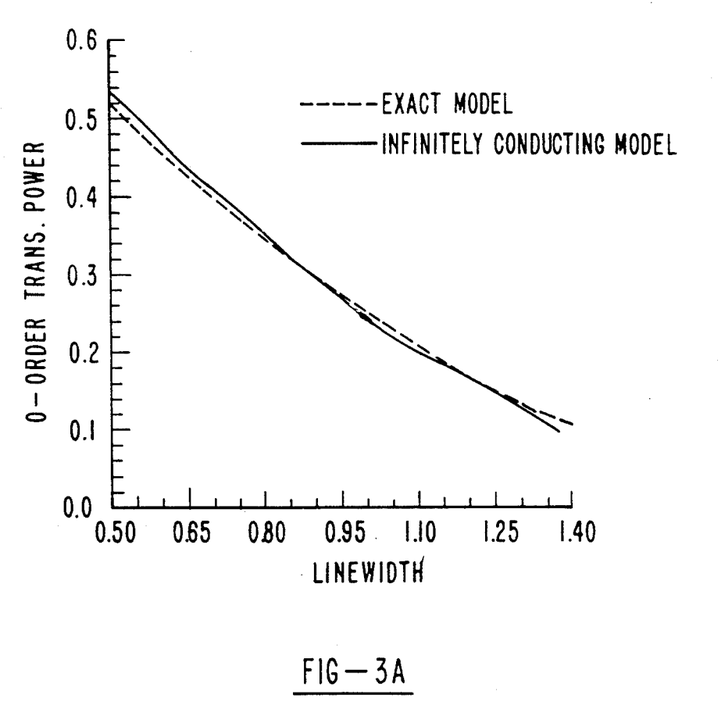
FIG. 3A is a graph of zero-order of transmitted power versus linewidth.

Referring to FIG. 3A, to verify the perfectly conducting model we use an exact theory to calculate diffraction effects. The exact values of the thicknesses and indices of the chrome and chrome oxide of the photomask are input into a computer program that uses the rigorous coupled wave analysis to calculate the power diffracted into the various orders. FIG. 3A is a plot comparing the predicted zero-order transmitted powers using the rigorous coupled wave model and the infinitely conducting model. The excellent agreement illustrates the validity of using the perfectly conducting model for the prediction of power diffracted into the transmitted zero-order.

Figure 4:
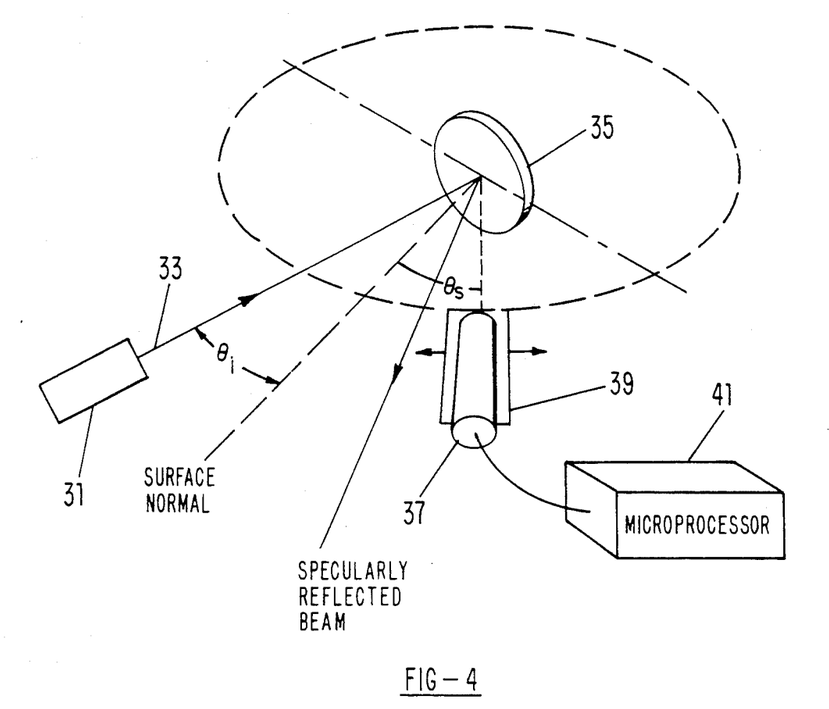
FIGS. 4 and 5 are diagrammatic views of implementation and testing apparatus in accordance with the embodiments of the invention.

In accordance with the invention, the arrangement shown in FIG. 4 may be used to implement the theoretical analysis set forth above. Light from a laser 31 is brought to focus in any suitable well known manner to form a beam 33. A sample such as a wafer or die 35 is placed in the path of beam 33 and a photodetector or photomultiplier 37 of any suitable well known construction. By moving the sample 35, it is possible to vary the spot diameter of the laser beam on the sample.

Figure 6:
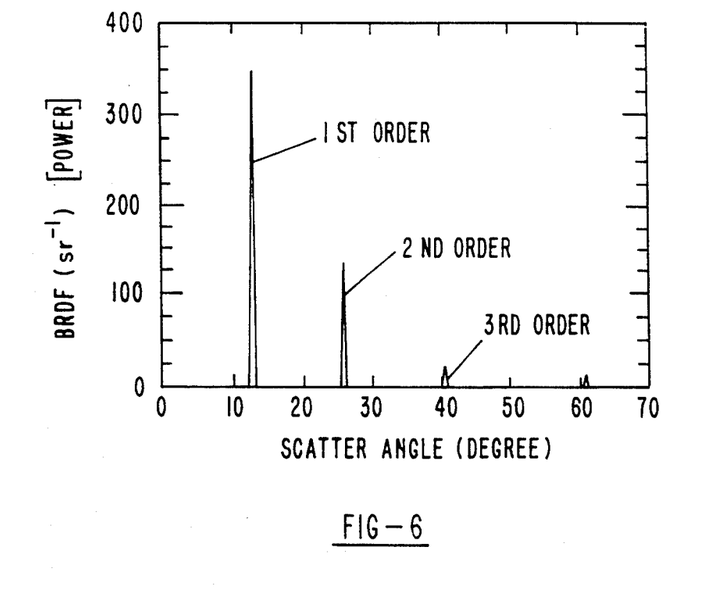
FIG. 6 is a graph of orders of diffracted power versus beam power.

Two different detector and data acquisition schemes were used for determining the scattered power. To obtain the grating pitch, the photodetector or photomultiplier tube (PMT) 37 is mounted on a rotation stage 39 of any suitable well known design. The distance from the sample to detector 37 is kept constant for all measurements. Processing microelectronics 41 of any suitable well known design may be used to process the detector readouts. The processor 41 may include a current-to-voltage amplifier, a digital multimeter, and a microprocessor, all of any suitable well known design. FIG. 6 is a plot of the scattered power as a function of the scatter angle. The angular location of each diffracted order can thus be accurately determined from such a plot allowing the pitch of the diffraction grating to be calculated.

Figure 5:
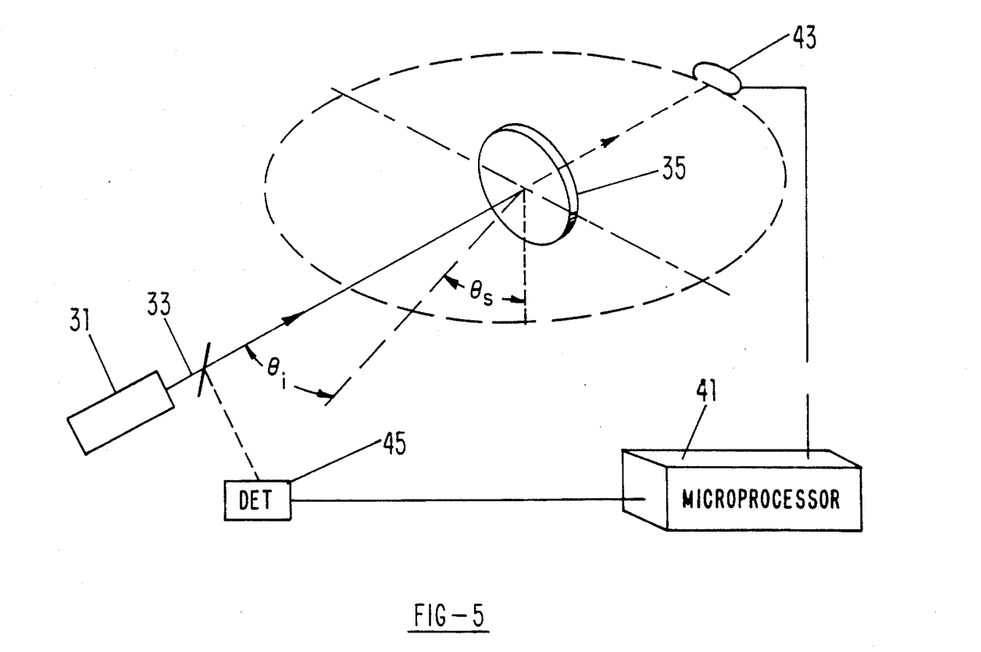

To make linewidth measurements, it is necessary to measure the total integrated power in the transmitted zero-order beam. An arrangement for this measurement is shown in FIG. 5. For this measurement, a photodiode 43 of any suitable design which has a large detector area is used. A measurement of the total power incident on the grating is also taken, via a beam splitter and a detector 45 for the incident beam 33 so that the fraction of total power diffracted into the transmitted zero-order beam can be accurately determined. The current produced in the photodiode 43 and detector 45 is passed to the processing electronics 41. Thus, through detector 45, a measurement of the total power incident on the grating of sample 35 is provided so that the fraction of total power diffracted into the transmitted zero-order reaching photodetector 43 can be accurately determined.

In accordance with the invention, because the predicted results of the present invention are based entirely on Maxwell's equations and the wavelength of light, they are absolute and not dependent on any kind of calibration. The fact that the results obtained in accordance with the teachings of the invention fall within the range of measurements obtained using other techniques, for the same gratings, further demonstrates the usefulness of the technique.

Figure 7:
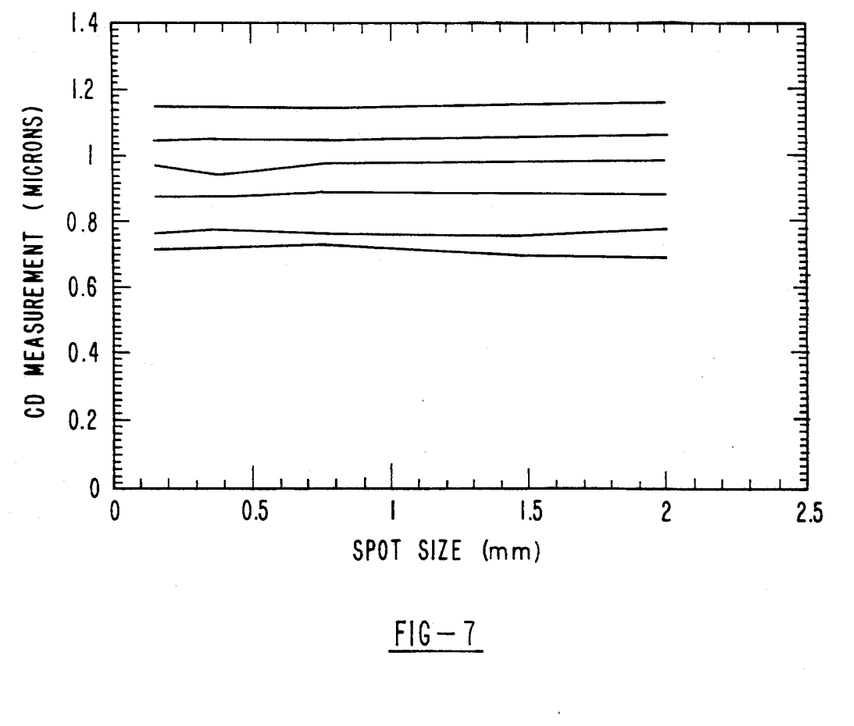
FIG. 7 is a graph of spot size versus critical dimension (CD) measurement.

The linewidth measured by the scatterometer system represents an average of the linewidths of many lines illuminated by the laser. Measurements were performed using different illuminating spot sizes to determine the effect of this averaging. The spot sizes included 2 mm, 760 $\mu$m, 380 $\mu$m, and 150 $\mu$m. A smaller illuminating spot reduces the number of lines over which averaging occurs during the measurement. In principle, if the linewidth is constant over the area of the grating, the CD measurement should not change with spot size. We examined a different mask (SF010), which was composed of six gratings, each having a linewidth of approximately 1 micron. The measured CD for each of the six gratings is plotted as a function of spot size in FIG. 7.

Figure 8:
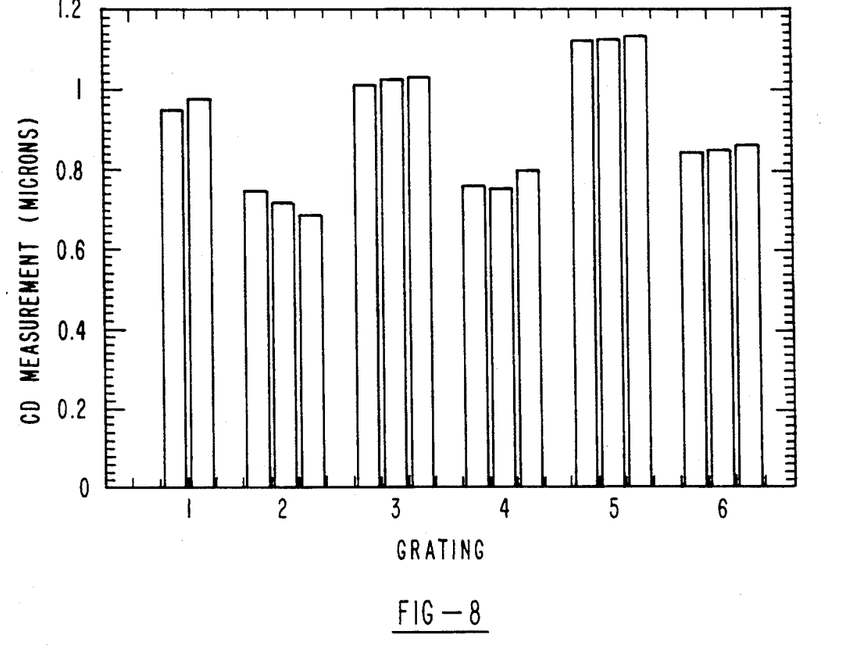
FIG. 8 is a graph of variation in grating position versus CD measurement.

An issue of importance in any measurement scheme is repeatability, both short term, where the sample is removed, replaced, and immediately remeasured, and long term, where the sample is remeasured after some extended period of time. In assessing repeatability of results of measurements conducted in accordance with the teachings of the present invention, we deliberately measured different positions on each grating to simulate an error in sample positioning that might occur while removing and replacing the sample. Second, we tested long term repeatability by remeasuring a sample at a later time. The results of measuring different positions on each grating of mask SF010 are shown in FIG. 8.

The graph shows small deviation in the CD measurement (6%) from position to position on a grating. It is not known whether this is due to a variation in measurement, a change in linewidth, or both. To test long term repeatability, each sample was measured three times during a three month period. The three calculated CDs for each measurement are found to be the same to within 4%. This indicates good long term repeatability for this instrument. The spot size for all of the above measurements was 2 mm.

Figure 9:
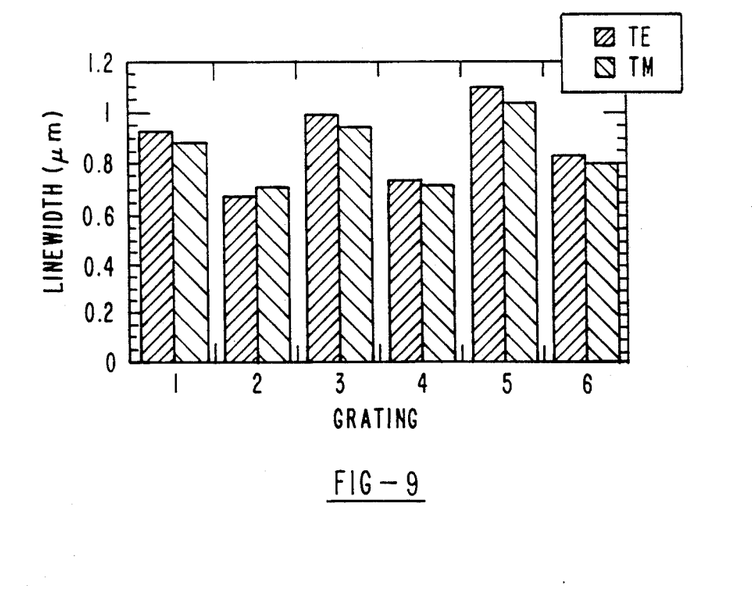
FIGS. 9 and 10 are graphs of plots of linewidths obtained using TE and TM polarization for each grating.

The power diffracted into the various orders is sensitive to the incident field polarization. It can be seen from FIG. 3 that this effect is nonlinear and cannot be accounted for by the application of a constant bias in the measured values. FIG. 9 indicates the linewidth obtained from measurements of gratings on mask SF010, in which the incident beam is TE or TM polarized. The difference in predicted linewidths using the two polarizations is less than 5.6%.

Figure 10:
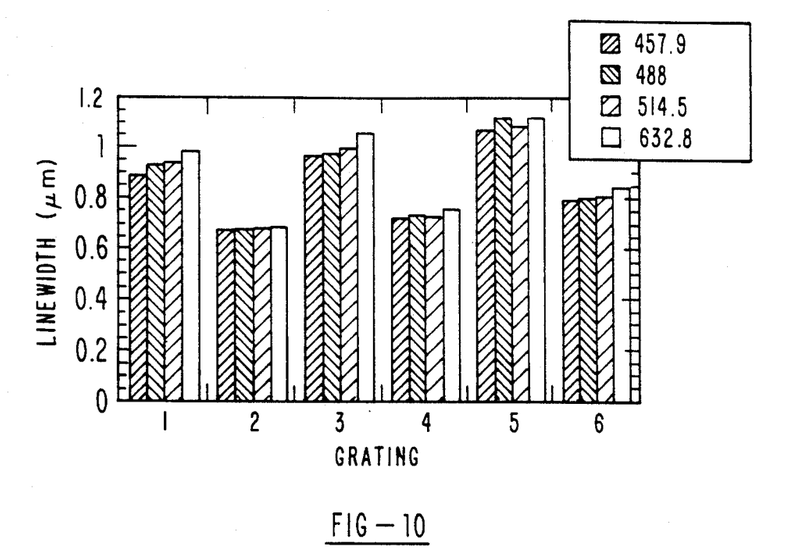

The effect of wavelength on linewidth measurements was explored, using four wavelengths, all with TE polarization. For each wavelength we obtained a theoretical curve similar to the TE curve in FIG. 3. The CD for each of the six gratings on mask SF010 was measured twice and then averaged for each wavelength. The results are shown in FIG. 10. The average deviation in CD measurements at the various wavelengths is less than 8%. Improved agreement was obtained between the measurements at different wavelengths for the smaller linewidths.

Figure 11:
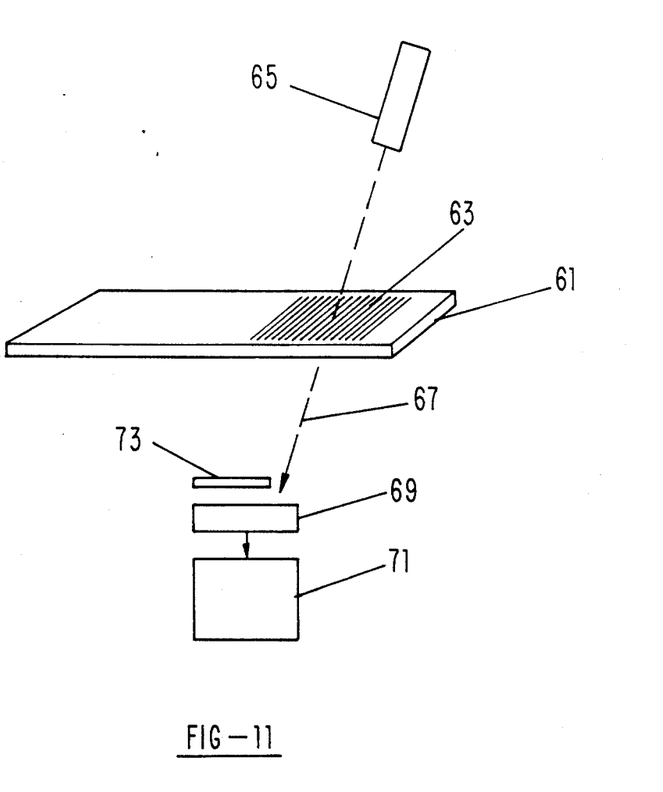
FIG. 11 is a diagrammatic view of apparatus in accordance with an embodiment of the invention.

Referring to FIG. 11, there is shown a scatterometry system which in accordance with an embodiment of the present invention takes advantage of the relationship between grating linewidth and the fraction of incident power in the transmitted zero-order, as shown in FIG. 3.

As shown in FIG. 11, a sample 61 has a grating 63 illuminated by a laser beam from source 65 resulting in distinct diffracted orders that are detected by a photomultiplier tube or detector 69 having a large detector area. From an accurate knowledge of the angle of incidence of the laser beam and the angular location of each diffracted order, the pitch of the grating is determined. The photodetector 69 is used to determine the total power diffracted into the transmitted zero-order, indicated by the line 67. Any suitable means such as a plate 73 may be interposed between the grating 63 and the detector 69 to prevent orders of diffracted power higher than the first order from reaching the detector 73. The current from the detector 69 is sent to processing electronics 71 of any suitable well known design which may, for example, include any suitable current-to-voltage amplifier, a digital multimeter (DMM) and a computer. The plot of FIG. 3 is stored in the computer memory so that when signals representing measured values of zero-order transmitted power are entered, linewidth values are extracted. This may be accomplished in any suitable well known manner, and according to the invention is of particular advantage in a production line context.

What is claimed is:

1. In critical dimension metrology of a specimen photomask grating, the method of accomplishing measurement of linewidth on a specimen photomask grating using scatterometry without the need for any calibration, said measurement being essentially insensitive to variations of beam angle of incidence and to beam spot size and position, comprising the steps of:

a) determining the angle of incidence of the laser beam and the location of each transmitted diffracted order and using this information to calculate the pitch of the grating.

b) using the pitch of the grating and the wavelength of the incident laser beam to derive from mathematical analysis a function of linewidth versus the fraction of total power diffracted from a theoretical model of a photomask grating into the transmitted zero-order c) measuring the power diffracted from the specimen photomask grating into the transmitted zero-order of diffracted power, and d) comparing said derived function with the measured power to determine the particular linewidth which corresponds to the measured power diffracted from the specimen photomask grating into the transmitted zero-order.

2. The method of claim 1 wherein the step of deriving includes the step of mathematically determining the inverse relationship between the scattered power in the transmitted zero-order which decreases monotonically with increasing line width of the photomask grating.

3. The method of claim 2 wherein the step of deriving further includes the step of mathematically averaging the procedure for a theoretical plurality of photomask gratings.

4. The method of claim 1 wherein the scatterometry employs a coherent beam that is used for the measurement.

5. Apparatus for accomplishing beam scatterometry measurement of linewidth of a specimen photomask grating without calibration, said measurement being essentially insensitive to variations of beam angle of incidence and beam spot size and position comprising:

a. radiation means for producing a beam of radiation impinging on the specimen grating;

b. means for detecting and measuring power diffracted into the transmitted zero order by said grating responsive to beam impingment thereon;

c. first means for storing a derived function of photomask grating linewidth versus a fraction of the total power diffracted from a theoretical model grating into the transmitted zero-order and for comparing said derived function with measured power diffracted from the specimen photomask grating to provide an indication of linewidth corresponding to the measured power, and d. second means coupled to said first means for entering thereto said measured power.

6. Apparatus as in claim 5 wherein said first means comprises a computer.

7. Apparatus as in claim 6 further comprising readout means responsive to said first means for producing an output for monitoring purposes.

8. Apparatus for accomplishing scatterometry measurement of linewidth of a specimen photomask grating without calibration, said measurement being essentially insensitive to variations of incident beam spot size and position, comprising:

a. radiation means for producing a beam of radiation impinging on the specimen grating;

b. means for detecting and measuring power diffracted into the transmitted zero-order by said grating responsive to beam impingment thereon;

c. processing means for storing a derived function of photomask grating linewidth versus a fraction of the total power diffracted from a theoretical model of the photomask grating into the transmitted zero-order;

d. and means included in said processing for comparing said derived function with the detected measurement of power diffracted from the specimen photomask grating responsive to said beam impinging thereon to thereby produce an output corresponding to the linewidth of the specimen photomask grating.

9. Apparatus as in claim 8 wherein said beam of radiation is a laser beam.

10. Apparatus as in claim 8 further comprising means to block from said detector essentially all but the transmitted zero-orders of diffracted radiation.

* * * * *